(12) United States Patent
Karipides et al.

(10) Patent No.: US 10,867,306 B1
(45) Date of Patent: Dec. 15, 2020

(54) PRODUCT DEMAND DATA VALIDATION

(75) Inventors: Daniel P. Karipides, Round Rock, TX (US); Elizabeth M. Schwartz, Austin, TX (US); John W. Kamm, IV, Austin, TX (US); James H. Ogden, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 1180 days.

(21) Appl. No.: 10/864,579

(22) Filed: Jun. 9, 2004

(51) Int. Cl.
*G06Q 30/02* (2012.01)

(52) U.S. Cl.
CPC .................................... *G06Q 30/02* (2013.01)

(58) Field of Classification Search
CPC .................................. G06Q 30/0202
USPC ............................................................. 705/10
See application file for complete search history.

(56) References Cited

U.S. PATENT DOCUMENTS

| | | | | | |
|---|---|---|---|---|---|
| 4,646,238 | A | * | 2/1987 | Carlson et al. ................. | 700/95 |
| 5,168,445 | A | * | 12/1992 | Kawashima et al. ........... | 705/10 |
| 5,454,104 | A | * | 9/1995 | Steidlmayer et al. | |
| 7,412,398 | B1 | * | 8/2008 | Bailey ............................. | 705/10 |
| 2002/0019795 | A1 | * | 2/2002 | Madoff et al. .................. | 705/37 |
| 2002/0087438 | A1 | * | 7/2002 | Kunieda et al. ................ | 705/28 |
| 2002/0103686 | A1 | * | 8/2002 | Slocum ............................ | 705/8 |
| 2002/0138319 | A1 | * | 9/2002 | Kaburagi ......... | G06Q 10/06312 705/7.22 |
| 2002/0143604 | A1 | * | 10/2002 | Cox et al. ....................... | 705/10 |
| 2002/0188499 | A1 | * | 12/2002 | Jenkins et al. ................. | 705/10 |
| 2003/0101107 | A1 | * | 5/2003 | Agarwal et al. ................ | 705/28 |
| 2003/0229550 | A1 | * | 12/2003 | DiPrima et al. ................ | 705/28 |
| 2004/0117273 | A1 | * | 6/2004 | Henderson et al. ............ | 705/28 |
| 2004/0148217 | A1 | * | 7/2004 | Lauring et al. ................. | 705/10 |
| 2004/0254826 | A1 | * | 12/2004 | Yang et al. ....................... | 705/8 |
| 2005/0060242 | A1 | * | 3/2005 | Armstrong et al. ............ | 705/28 |
| 2005/0075949 | A1 | * | 4/2005 | Uhrig et al. .................... | 705/28 |
| 2005/0177435 | A1 | * | 8/2005 | Lidow ............................. | 705/22 |
| 2005/0228735 | A1 | * | 10/2005 | Duquette ......................... | 705/37 |
| 2005/0261975 | A1 | * | 11/2005 | Carver ............................. | 705/22 |

OTHER PUBLICATIONS

Lee, Padmanabhan, and Whang. "The Bullwhip Effect in Supply Chains". Sloan Management Review/Spring 1997. p. 93-102.*

* cited by examiner

*Primary Examiner* — Sujay Koneru
(74) *Attorney, Agent, or Firm* — Kent B. Chambers; Terrile, Cannatti & Chambers, LLP (57) ABSTRACT

A validation engine validates product demand data using novel supply-demand imbalance data. Validating the product demand data provides confidence that the demand data is accurate. Confidence in the demand data allows manufacturers, distributors, and others involved in commerce to rely upon the demand data for product manufacture and ordering. The validation engine correlates determined product demand data with product supply data to generate 'imbalance data'. The product supply data represents data for the same time period as the time period of the product demand data. The imbalance data is, in one embodiment, a difference between the product supply data and the product demand data. In one embodiment, the validation engine generates the imbalance data by subtracting product demand data from the supply data associated with the same product. Negative imbalance data indicates undersupplied products, and positive imbalance data indicates oversupplied products.

42 Claims, 8 Drawing Sheets

PRODUCT DEMAND DATA VALIDATION

BACKGROUND OF THE INVENTION

Field of the Invention

The present invention relates to electronic data processing and more specifically relates to a method and apparatus for validating product demand data.

Description of the Related Art

Manufacturers often attempt to determine demand for certain products. In many industries, such as the automotive industry, a significant time delay exists between when a product should be specified for manufacture and when the product is available for sale. Manufacturers risk a significant amount of revenue based on expected demand. For example, consider a truck manufacturer who builds 25% of the trucks with 4×4 drive trains and 75% with 4×2 drive trains based on an inaccurate data. The manufacturer and dealers typically lose a significant amount of money if the actual demand for 4×4 versus 4×2 trucks is more than a few percentage points different from expectations. Even if the profit margins on 4×4 and 4×2 trucks are the same, a dealer may be forced to discount a 4×4 truck to a buyer who preferred a 4×2 truck and vice versa. Therefore, manufacturers who base manufactured products on expected demand place a high value in accurate product demand measurement.

Unfortunately, consistently determining accurate demand remains an elusive goal. In the above example, the truck manufacturer divided truck production between 4×2 trucks and 4×4 trucks. In reality, the set of products is often very large, where each particular factory configuration of a product is considered a separate product. For example, not only do manufacturers require the demand for drive trains, they also require information about a large number of other configuration alternatives such as exterior and interior colors, engine sizes, body styles, seat numbers, option packages, and wheel type. The increasing number of configuration options renders consistently determining demand difficult.

Manufacturers often use actual dealer sales data to measure demand. However, historically such data is often not a good predictor of future buying trends. The primary reason for such inaccuracy is often referred to as the "white car problem". Consider the situation where a buyer prefers a red car but and the dealer only has white cars. In this situation, the buyer may purchase the white car. Dealers often entice buyers with incentives such as vehicle discounts, extra options at no additional charge, and/or a higher trade-in allowance. The manufacturer's sales data will indicate that the white car sold reasonably quickly, which will lead to the improper recommendation for a prompt replenishment of white cars. Thus, the actual sales data does not accurately represent buyer demand.

Although manufacturers and others have attempted to develop product demand data, the confidence level in such demand data remains low due to its historically large, average margin of error over time. Supply and demand are well-known economic factors. However, directly correlating supply with product demand data has not yielded consistent validation of product demand data. As a result of the low margin of confidence in product demand data, all such data is generally viewed with a high degree of skepticism. Technology to validate product demand data including the demand data generation methodology has remained elusive.

SUMMARY OF THE INVENTION

In one embodiment of the present invention a method of validating demand data for products in an electronic data processing system includes retrieving product demand data for a particular time period from an electronic memory and retrieving product supply data for an at least similar time period to the particular time period associated with the product demand data. The method further includes processing the retrieved product demand data and product supply data with one or more data processors to generate supply-demand imbalance data, retrieving commerce data associated with the products for an at least similar time period to the particular time period associated with the product demand data, and comparing the supply-demand imbalance data with product commerce data. The method also includes generating validation data from a comparison of the supply-demand imbalance data with product commerce data and determining if the validation data validates the product demand data.

In another embodiment of the present invention a product demand data validation system includes an imbalance generator to generate supply-demand imbalance data from product demand data and product supply data and a validation engine to receive the supply-demand imbalance data, compare the supply-demand imbalance data with product commerce data, generate validation data from a comparison of the supply-demand imbalance data with product commerce data, and determine if the validation data validates the product demand data.

In another embodiment of the present invention a computer program product having code encoded therein to direct a processor to process data, the code including retrieval code to retrieve (a) product demand data for a particular time period from an electronic memory, (b) product supply data for an at least similar time period to the particular time period associated with the product demand data, and commerce data associated with the products for an at least similar time period to the particular time period associated with the product demand data. The code further including imbalance generation code to process the retrieved product demand data and product supply data with one or more data processors to generate supply-demand imbalance data and validation code to compare the supply-demand imbalance data with product commerce data and generate validation data from a comparison of the supply-demand imbalance data with product commerce data for determining if the validation data validates the product demand data.

In another embodiment of the present invention a system for displaying product demand validation data derived from supply-demand imbalance data and product commerce data includes a display apparatus, a memory having display data encoded therein, and a processor, coupled to the memory, to access the display data and cause the display apparatus to display:

a first quadrant for validation data derived from product commerce data indicating better than average product movement versus oversupply imbalance data;

a second quadrant for validation data derived from product commerce data indicating better than average product movement versus undersupply imbalance data;

a third quadrant for validation data derived from product commerce data indicating worse than average product movement versus undersupply imbalance data;

a fourth quadrant for validation data derived from product commerce data indicating worse than average product movement versus oversupply imbalance data.

In another embodiment of the present invention an electronic product demand data validation system includes means for retrieving product demand data for a particular time period from an electronic memory, means for retrieving product supply data for an at least similar time period to the particular time period associated with the product demand data, and means for processing the retrieved product demand data and product supply data with one or more data processors to generate supply-demand imbalance data. The system further includes means for retrieving commerce data associated with the products for an at least similar time period to the particular time period associated with the product demand data, means for comparing the supply-demand imbalance data with product commerce data, means for generating validation data from a comparison of the supply-demand imbalance data with product commerce data, and means for determining if the validation data validates the product demand data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Validating the product demand data provides assurance that the product demand data is accurate. Accurate product demand data allows manufacturers, distributors, and others involved in commerce to rely upon the demand data for many applications, including product manufacture and ordering. Accurately knowing demand allows manufactures to, for example, produce a supply of products that matches the demand for such products.

To validate the product demand data, the validation engine contrasts product demand data with product supply data to generate 'imbalance data' that reflects an imbalance between product supply data and product demand data. Generation of imbalance data provides a significant breakthrough in demand data validation technologies. The actual product supply data represents data for the same time period as the time period of the product demand data. The imbalance data is, in one embodiment, a difference between the product supply data and the product demand data. In one embodiment, the validation engine generates the imbalance data by subtracting product demand data from the product supply data associated with the same product. Negative imbalance data indicates undersupplied products, and positive imbalance data indicates oversupplied products.

The validation engine compares the imbalance data with actual commerce data associated with corresponding products for the same time period as the product demand data. The validation engine validates the product demand data if the imbalance data trends toward undersupplied products as the commerce data trends towards better than average product movement. Better than average product movement, in one embodiment, denotes a faster than average time to move product, and worse than average product movement, in one embodiment, denotes slower than average time to move product. Comparing the product demand data with multiple types of commerce data can increase confidence in the validation of the product demand data and the methodology used to generate the demand data. Additionally, some times only a limited amount of commerce data is available. The validation engine and validation process provide a flexible platform for validating demand data using any number of commerce data types. Examples of commerce data types include (1) the average number of days that a product available for sale and remains unsold (referred to as "days to turn)" and (2) the percentage of products of a particular type that are traded between distributors or dealers (referred to as "dealer trade rate"). Other commerce data types can be used such as a "period supply" metric which measures the amount of product supply divided by an average sales rate over a period of time. For example, a "days supply" represents the amount of product supply divided by the average daily product sales rate. In general, the commerce data preferably reflects product sales related metrics.

Figure 1:
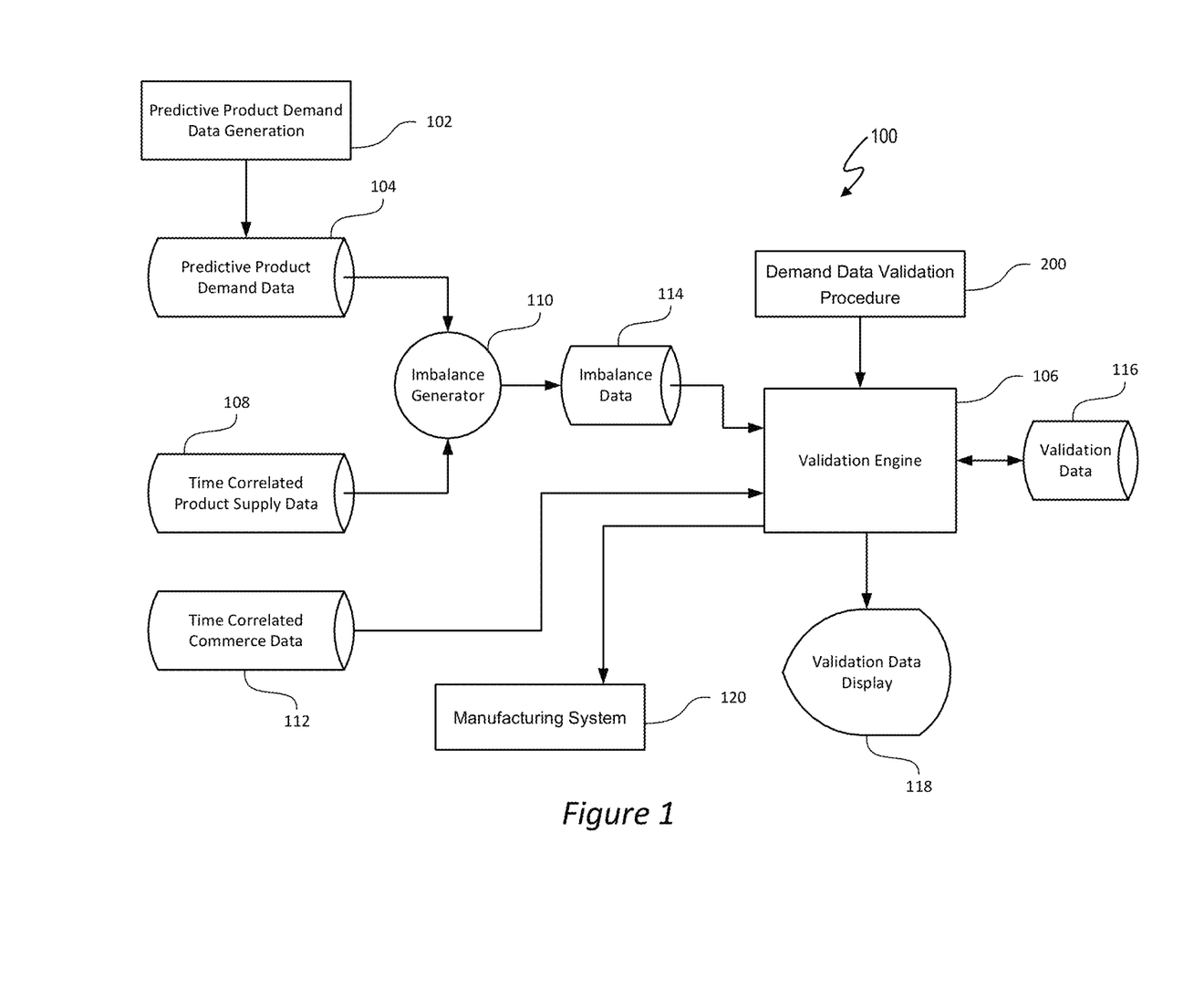
FIG. 1 depicts a demand data validation system for validating product demand data.

FIG. 1 depicts a demand data validation system 100 for validating product demand data. The demand validation system 100 performs the demand data validation procedure 200 of FIG. 2. The operation of demand validation system 100 will be discussed in conjunction with execution of the demand data validation procedure 200. The product demand data generation system 102 generates product demand data 104 (also referred to herein for conciseness as "demand data 104"). The demand data 104 can be expressed in any number of ways, such as on a per product basis and as a percentage of demand for a particular product relative to demand for all products associated with the demand data 104. The product demand data generation system 102 generates product demand data 104 in accordance with the generation process 202. Examples of a generation process 202 and product demand data 104 are described in U.S. patent application Ser. No. 10/699,148, filed Oct. 31, 2003, entitled "Identifying Quality User Sessions and Determining Product Demand With High Resolution Capabilities", inventor Daniel P. Karipides, and assignee Trilogy Development Group, Inc. (referred to as the Karipides Patent). The Karipides Patent is incorporated by reference herein in its entirety. The demand data described in the Karipides Patent is actual demand data generated using user web session logs. The demand data collected in the Karipides Patent is particularly useful in providing information to manufacturers that allows them to produce a supply of configured products that matches demand.

In general, the validation engine 106 correlates product demand data 104 with information that indicates supply for a product or products. Direct correlation of product demand data with information indicating supply does not necessarily yield high confidence validation results. The demand data validation system 100 can generate high confidence validation results through the generation and processing of imbalance data 114 and can also cast doubt on the confidence of product demand data 104. In one embodiment, imbalance data 114 represents a difference between product supply data 108 and product demand data 104.

Figure 2:
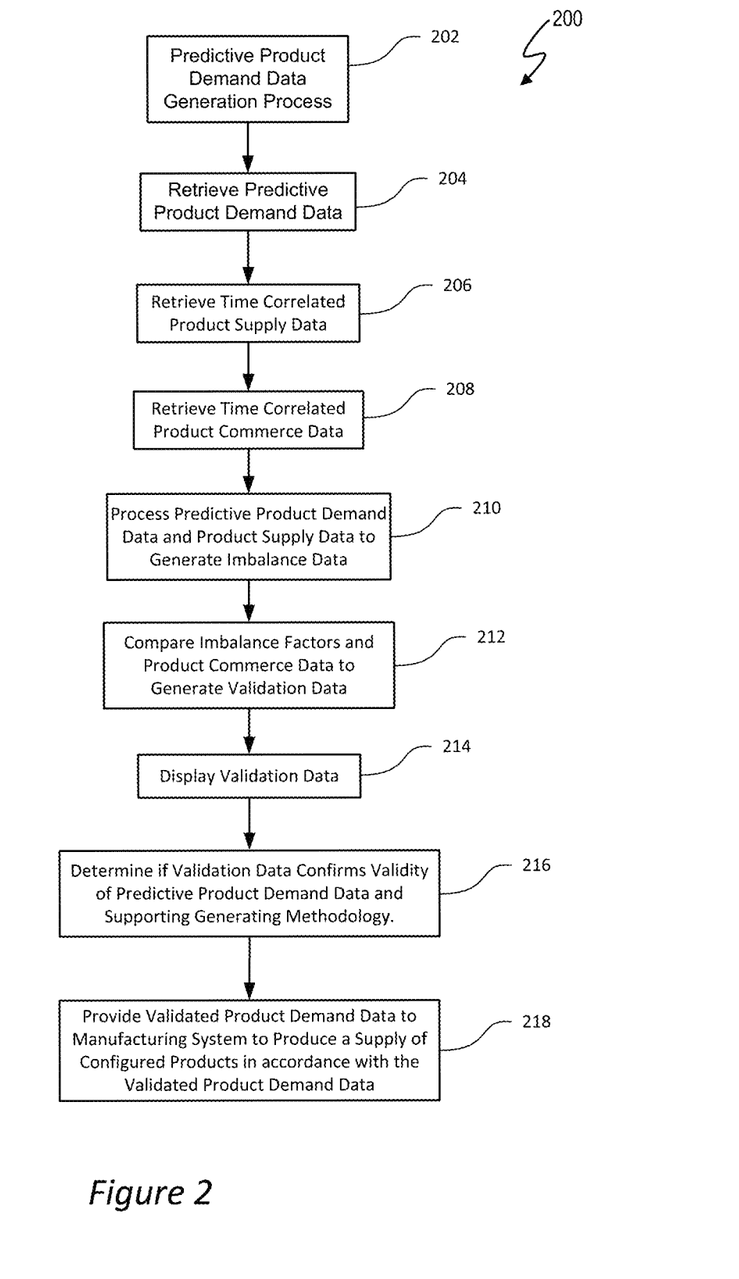
FIG. 2 depicts a demand data validation procedure.

In operations 204 and 206, the imbalance generator 110 respectively retrieves the product demand data 104 and correlated product supply data 108. The product supply data 108 has a similar time period in that the supply data 108 is approximately correlated in time with the time period of the demand data 104. For example, if the demand data 104 represented demand for products during a specific time period, the product supply data 108 should preferably reflect product supply during approximately the same time period. Of course, the supply data also correlates at a product level, i.e. the products referenced by the demand data 104 are at least relevant equivalents to the products as the products referenced by the product supply data 108. "Relevant equivalent" products are products that may not have identical features to the products referenced by the demand data 104 but are similar in that any dissimilar features most likely do not affect supply in a statistically relevant amount. For example, Product A and Product B may both be trucks and the dissimilarities between them do not significantly influence sales and, thus, supply. The product supply data 108 can be expressed on a per product basis and as a percentage of supply for a particular product relative to supply of all products associated with the demand data 104. Note that a product can be a physical product, services, and/or a collection of products.

Figure 3:
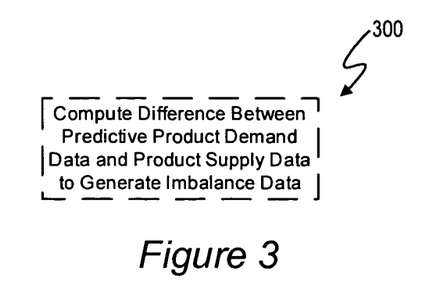
FIG. 3 depicts an imbalance data generation process used in the demand data validation procedure of FIG. 2.

In operation 210, the imbalance generator 110 processes the demand data 104 and product supply data 108 to generate imbalance data 114. Imbalance generation process 300 represents one embodiment of the imbalance generation operation 210. Imbalance generation process 300 generates imbalance data 114 on a product-by-product basis using demand data 104 and product supply data 108 percentages. The imbalance generation process 300 generates per supply-demand imbalance data 114 by subtracting per product percentages of product demand data 104 from per product percentages of product supply data 104. Negative supply-demand imbalance data indicate undersupplied products, and positive supply-demand imbalance data indicate oversupplied products. Note, the "-" in "supply-demand" is a hyphen not a mathematical, subtraction operator.

The validation engine 106 generates validation data 116 from the imbalance data 114 and time correlated commerce data 112. The time correlated commerce data 112 is time correlated with the demand data 104 in the same sense as the product supply data 108. In one embodiment, the validation engine 106 generates validation data 116 by correlating imbalance data 114 and commerce data on a product-by-product basis.

In operation 212, validation engine 106 generates the validation data 116 by comparing the imbalance data 114 and product commerce data 112. Additionally, comparing the demand data 104 with multiple types of commerce data 112 can increase confidence in the product demand data 104 and the methodology used to generate the demand data 104. Examples of commerce data types include (1) the average number of days that a product available for sale and remains unsold (referred to as "days to turn" and (2) the percentage of products of a particular type that are traded between distributors or dealers (referred to as "dealer trade rate).

Figure 4:
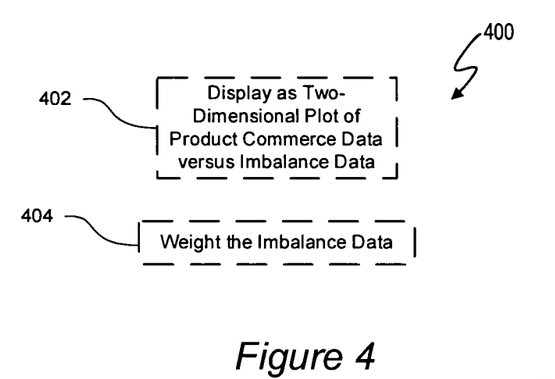
FIG. 4 depicts an embodiment of a validation data generation operation.

Imbalance data 114 and commerce data 112 can be compared by validation engine 106 in any number of ways to generate validation data 116 on a product-by-product basis. Comparison operation 400 in FIG. 4 represents one embodiment of operation 212. Operation 402 generates validation data 116 from the imbalance data 114 and commerce data 112 by making a two-dimensional comparison of imbalance data 114 versus commerce data 112. Operation 404 weights product validation data 116 by the number of products represented by each validation data point.

The results of comparison operation 400 can be plotted on a two-dimensional graph with the Y-axis representing commerce data and the X-axis representing imbalance data 114. The intersection of commerce data 112 and imbalance data 114 represents the validation data 116. Operation 214 displays the validation data 116 in validation display 118 as a function of weighted commerce data 112 and imbalance data 114.

In operation 216, the validation engine 106 also analyzes the comparison of commerce data 112 and imbalance data 114 to determine if the validation data 116 confirms the validity (accuracy) of the product demand data 104. In one embodiment, the validation engine 106 determines that the demand data 104 is valid if the validation data 116 indicates that slower than average product movement correlates with oversupplied imbalance data and better than average product movement correlates with undersupplied imbalance data. Product movement is reflected in supply related commerce data and generally refers to the movement of a product in commerce. Movement can occur, for example, by the sale of a product to a consumer or from the transfer of a product from one distributor to another. Determining a validation trend represents one process of determining if the validation data 116 indicates that slower than average product movement correlates with oversupplied imbalance data and better than average product movement correlates with undersupplied imbalance data. A validation trend can be determined by taking into account weighted validation data 116 and using the standard statistical technique of least squares fit, also known as linear regression or Pearson's correlation to determine a trend relationship among validation data 116. Accordingly, the computation of the validating trend can confirm the validity of the product demand data used to generate the validation data 116.

However, if the validation engine 106 does not confirm the validity of the demand data 104, the demand data 104 may still be accurate because the commerce data 112 may have been influenced by factors other than supply and demand. For example, the demand for products can be artificially stimulated by offering incentives, and other techniques to sell products that otherwise would have taken longer to sell or may not have sold at all and products that may have been overpriced.

Figure 5:
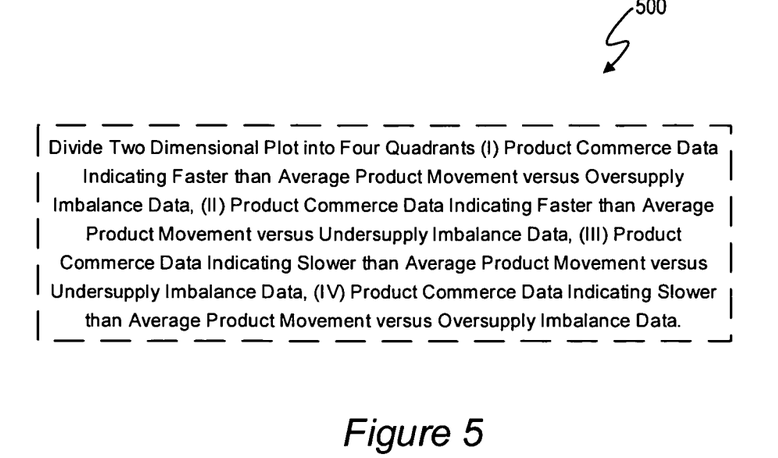
FIG. 5 depicts an embodiment of a product demand data validation operation.

The validation process 500 depicts one embodiment of the validation process of operation 216. Validation process 500 separates validation data 116 into four quadrants. The four quadrants are defined as: (I) Product Commerce Data Indicating Better than Average Product Movement versus Oversupply Imbalance Data, (II) Product Commerce Data Indicating Better than Average Product Movement versus Undersupply Imbalance Data, (III) Product Commerce Data Indicating Worse than Average Product Movement versus Undersupply Imbalance Data, (IV) Product Commerce Data Indicating Worse than Average Product Movement versus Oversupply Imbalance Data. Thus, the validation data 116 confirms the validity of product demand data 104 with a high degree of confidence if the validation data 116 reflects a trend with a positive slope in the general direction from quadrant II to quadrant IV. All validation data 116 may not reside in quadrants II and IV, which is to be expected because of the inherent uncertainty in factors that affect the commerce data and demand data. Nevertheless, validation data that reflects a trend of increasingly fast moving commerce data with decreasing oversupply imbalance data (or conversely decreasingly slow moving commerce data with increasing oversupply imbalance data) validates the product demand data 104 used to generated the validation data 116.

FIGS. 6 through 9 depict examples of the display of validation data 116 and validation confirmation analysis. Validation displays 600, 700, and 800 represent two dimensional displays divided into four quadrants: (I) Product Commerce Data Indicating Better than Average Product Movement versus Oversupply Imbalance Data, (II) Product Commerce Data Indicating Better than Average Product Movement versus Undersupply Imbalance Data, (III) Product Commerce Data Indicating Worse than Average Product Movement versus Undersupply Imbalance Data, (IV) Product Commerce Data Indicating Worse than Average Product Movement versus Oversupply Imbalance Data. The relative weight of each validation data point is indicated by the relative size of the data point.

Figure 6:
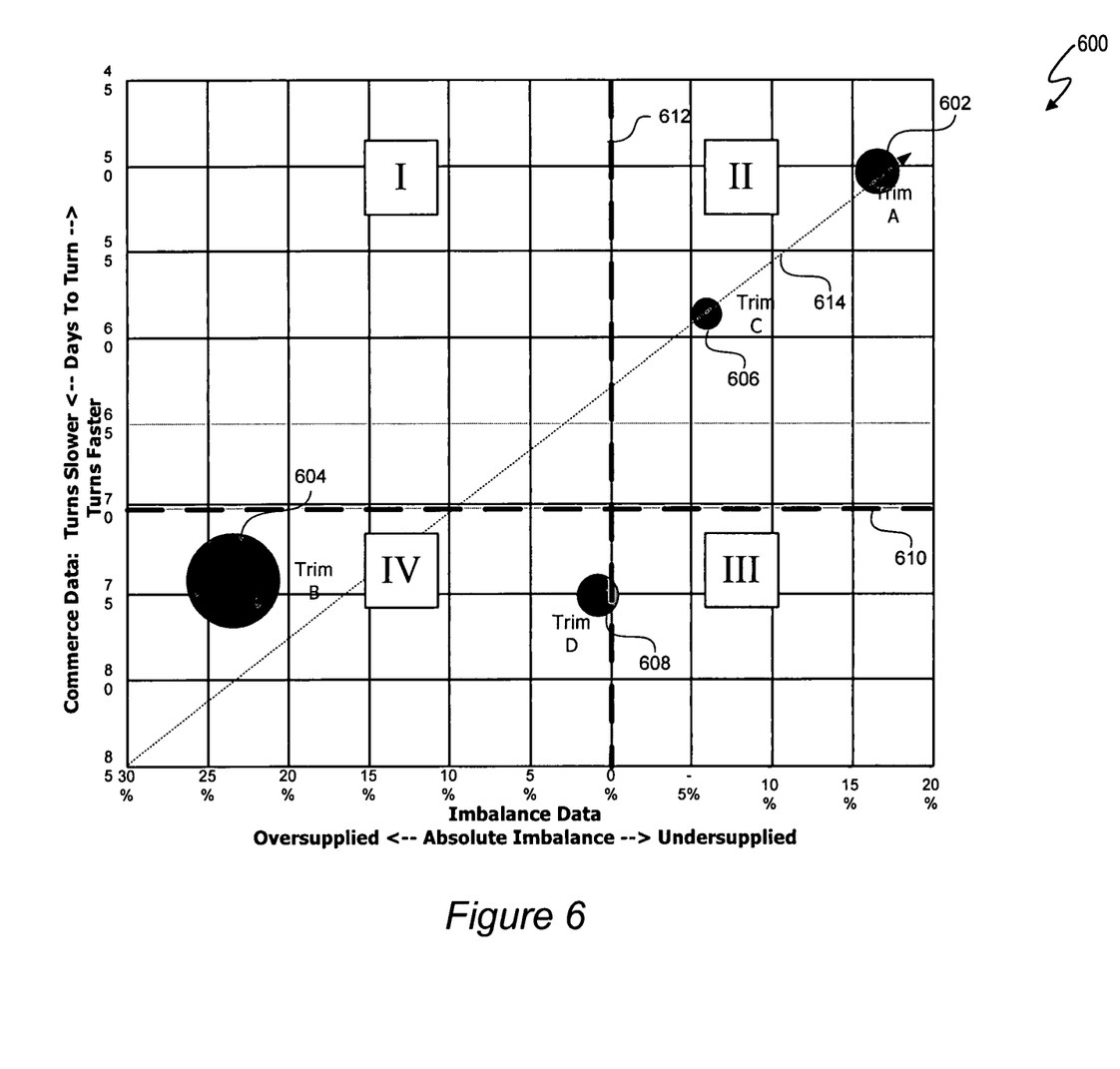
FIGS. 6-8 depict example displays of validation data processing and product demand data validation.
Figure 7:
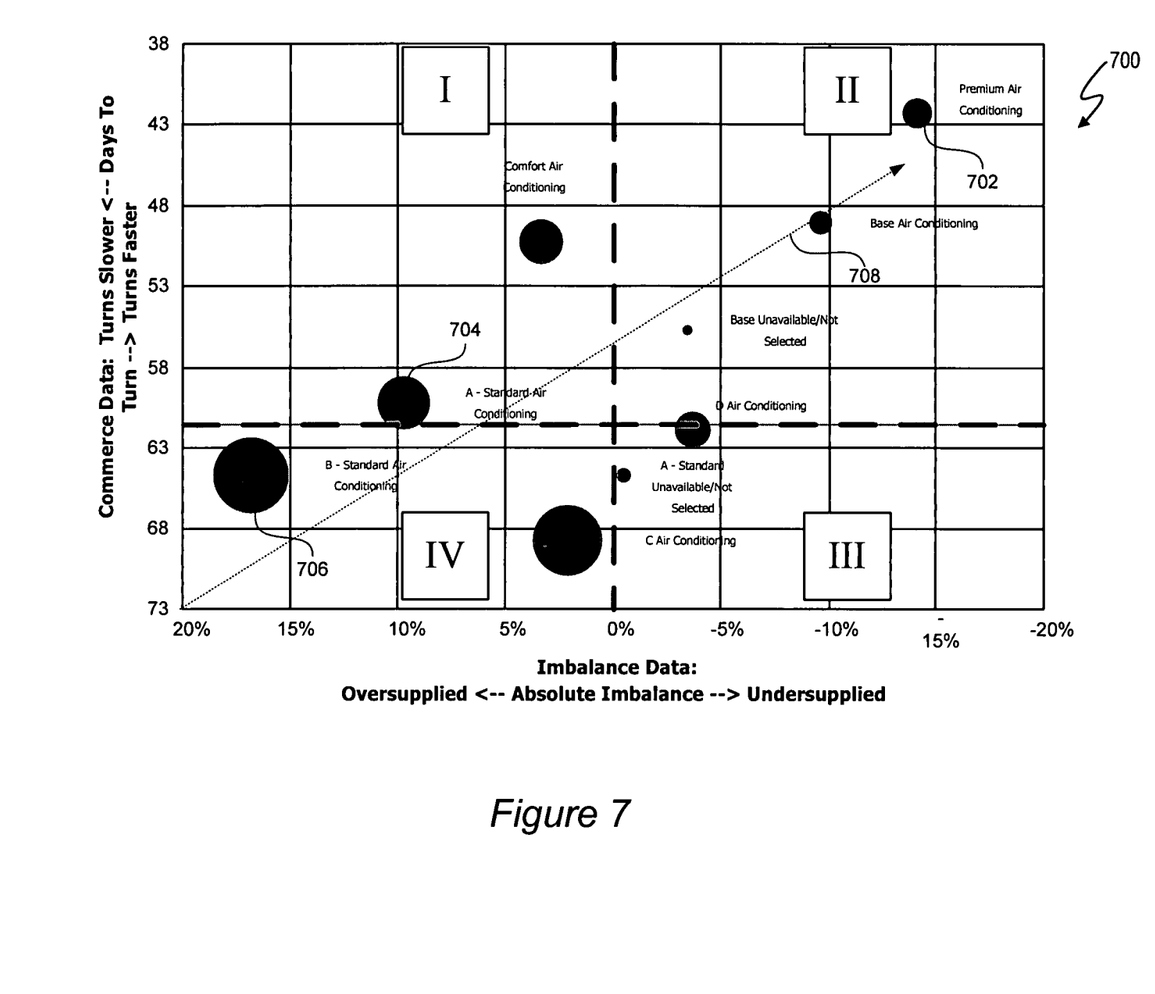
Figure 8:
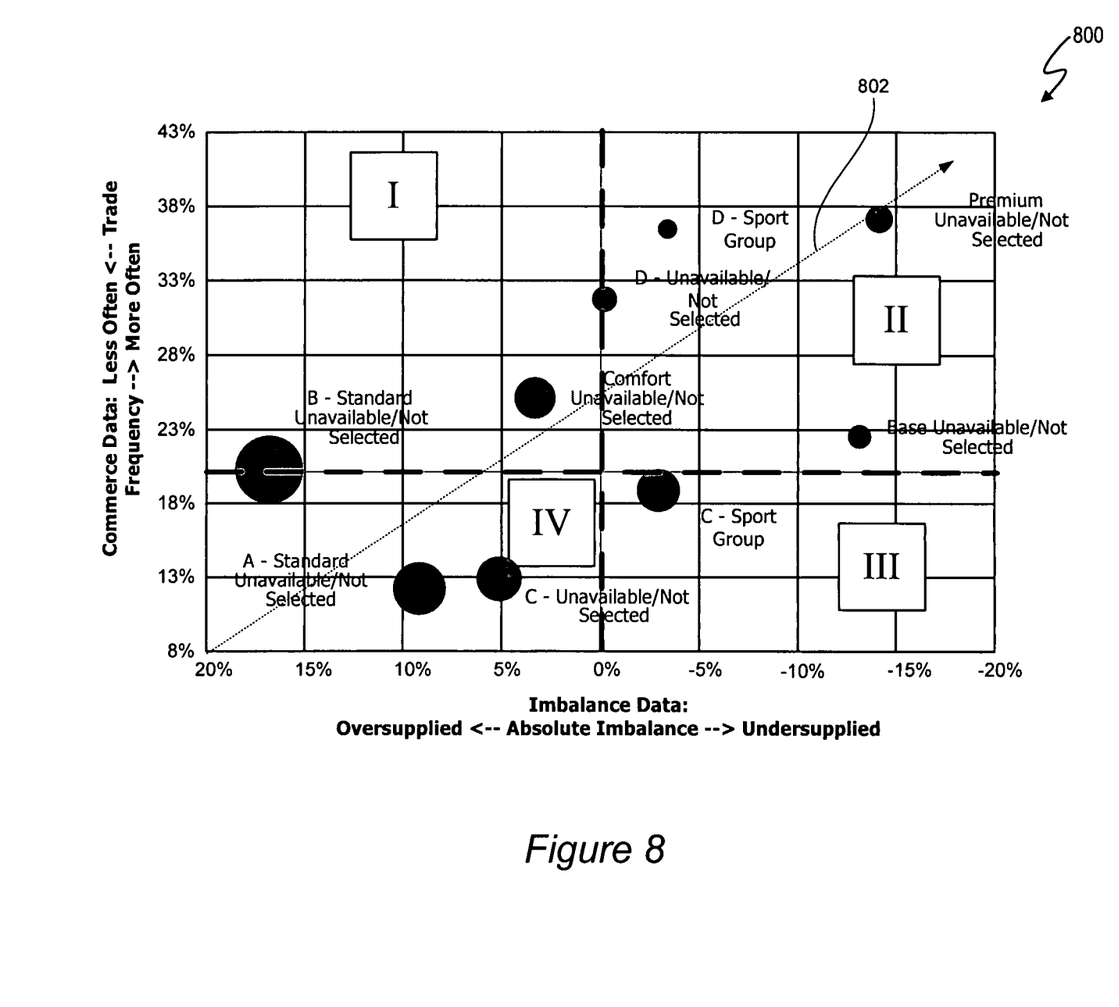

The display 600 of validation results in FIG. 6 is derived from example data set forth in Table 1. Table 1 depicts four products, which are actually different trim packages of a common product model. The commerce data is represented by Days To Turn. The four quadrants (I, II, III, and IV) of display 600 are divided by the Global Average Days to Turn 610 and by an imbalance data segment of 0% over/under supply-demand data 612. A normalized weight is applied to the validation data point so that the validation engine 106 gives appropriate significance to each validation data point according to the data sample size. The radius of the bubbles representing validation data points in displays 600, 700, and 800 reflect the relative normalized weight of each validation data point. As with generally all operations that involve drawing conclusions from data, the amount and quality of product demand data 104, product supply data 108, and commerce data 112 should be statistically relevant to reflect actual circumstances and, thus, provide a degree of confidence in conclusions drawn from the data. Technology to determine confidence levels in demand data samples is available from, for example, Trilogy Software, Inc. of Austin, Tex.

TABLE 1

| Product | Global Avg Days To Turn | Imbalance Data | Days To Turn | Products Moved | Normalized Weight (product moved/least product moved) |
| --- | --- | --- | --- | --- | --- |
| Trim A | 69.771 | −16.58% | 50.409 | 5826 | 2.09 |
| Trim B | 69.771 | 23.39% | 74.227 | 25767 | 9.24 |
| Trim C | 69.771 | −6.011% | 58.690 | 2789 | 1 |
| Trim D | 69.771 | 0.8042% | 75.155 | 5365 | 1.92 |

The validation data points 602, 604, 606, and 608 reside in quadrants II and IV. The relative sizes of validation points 602, 604, 606, and 608 represent the relative number of products represented by the respective validation points. Validation point 604 indicates that Trim B is oversupplied relative to demand and, thus, has a 'turn', i.e. sell, time longer than average. Validation point 602 indicates that Trim A is undersupplied relative to demand and, thus, is turning faster than average. Validation point 608 indicates that Trim D is neither oversupplied nor undersupplied relative to demand. Validation point 606 indicates that Trim C is undersupplied relative to demand and is also selling at a faster than average turn rate. The turn rate of Trims B and D is approximately equal, but the respective supply-demand imbalance is different. This does not necessarily invalidate the product demand data 104 used to generate the validation data because a validating trend line 614 indicates a trend of decreasing imbalance as product oversupply decreases. Thus, the validating trend line 614 indicates that the product demand data 104 is accurate but other market forces generally unrelated to demand are influencing the turn rate.

The validating trend line 614 is determined, for example, using the standard statistical technique of least squares fit, also known as linear regression or Pearson's correlation. Determination of the validating trend line 614 should take into account the weighting of the validation data 116. The process of calculating a least squares fit provides two pieces of information—both the position and slope of the line as well as how well the validation data points fit the trend. Cases where the trend line is in the correct direction and the fit is good provide strong validation of the demand data. Thus, more significance is placed on validation data points reflecting a higher sample size. When the validation trend proceeds from quadrant II to quadrant IV, validation of product demand data 104 can be assumed. When the validation data 116 reside exclusively in quadrants II and IV, validation of the product demand data 104 can be concluded. As a result of a determination of validity, the methodology used to produce the product demand data 104 is likewise validated.

Validation display 700 represents results of the validation engine 106's comparison and analysis of Days to Turn commerce data and imbalance data. Validation display includes a number of validation data points that are characterized by a particular product feature and a number of validation data points characterized by a model identifier (A, B, C, or D) and a particular product feature. The commerce data 112 used in validation display 700 is also "Days to Turn". Each validation data point represents a product or equivalent products configured as indicated. For example, validation data point 702 represents automotive products of a particular dealer that include premium air conditioning. Validation points 704 and 706 respectively represent vehicle A with standard air conditioning and vehicle B with standard air conditioning. As indicated by the respective sizes of validation points 704 and 706, validation point 704 represents more vehicle B products than the number of vehicle A products represented by validation point 702. The validation trend line 708 indicates a progressive trend in the weighted validation data 116 from oversupply imbalance and a greater than average turn rate to undersupply imbalance and a lower than average turn rate. Thus, validation engine 106 confirms the validity of the product demand data 104 used to generate the validation data 116 of display 700.

FIG. 8 depicts display 800, which compares trade frequency type commerce data 112 with supply-demand imbalance data 114. The validating trend line 802 indicates a progressive trend from less than average performance commerce data and oversupply supply-demand imbalance toward greater than average performance commerce data and undersupply supply-demand imbalance. Accordingly, the computation of the validating trend confirms the validity of the product demand data used to generate the validation data 116 displayed in display 800. Display 800 also represents the flexibility of demand data validation system 100 and demand data validation procedure 200 to validate product demand data 104 using different types of commerce data 112.

Figure 9:
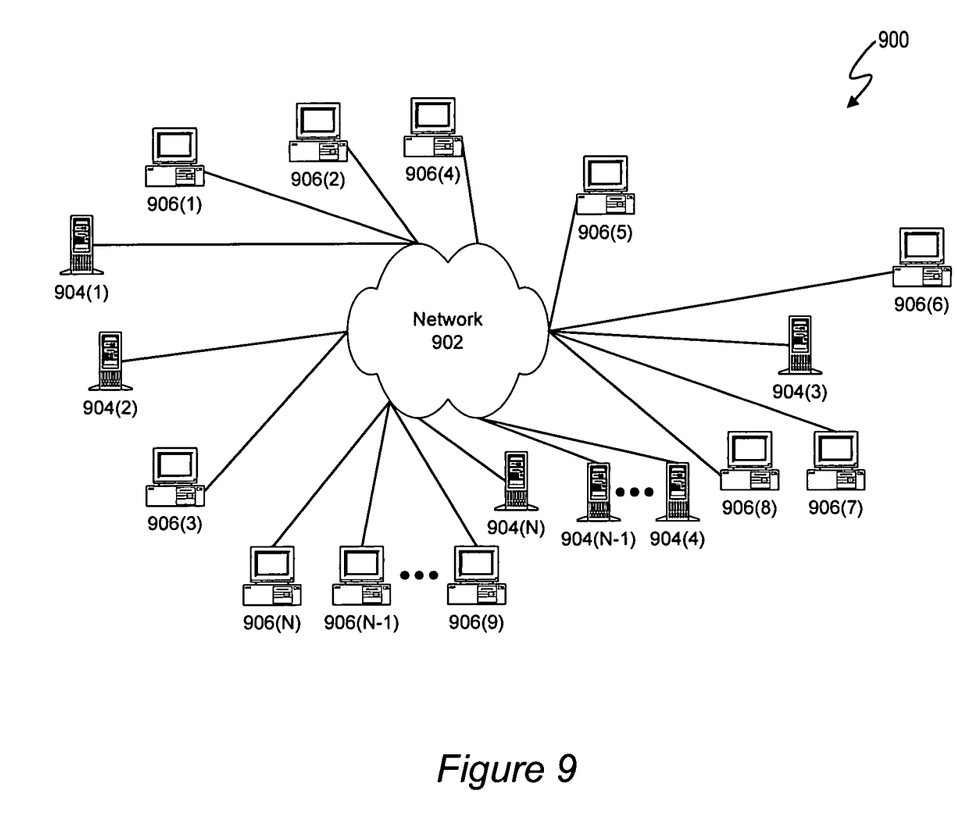
FIG. 9 depicts a block diagram illustrating a network environment in which a demand validation system and procedure may be practiced.

FIG. 9 is a block diagram illustrating a network environment in which a demand validation system and procedure may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 10.

Figure 10:
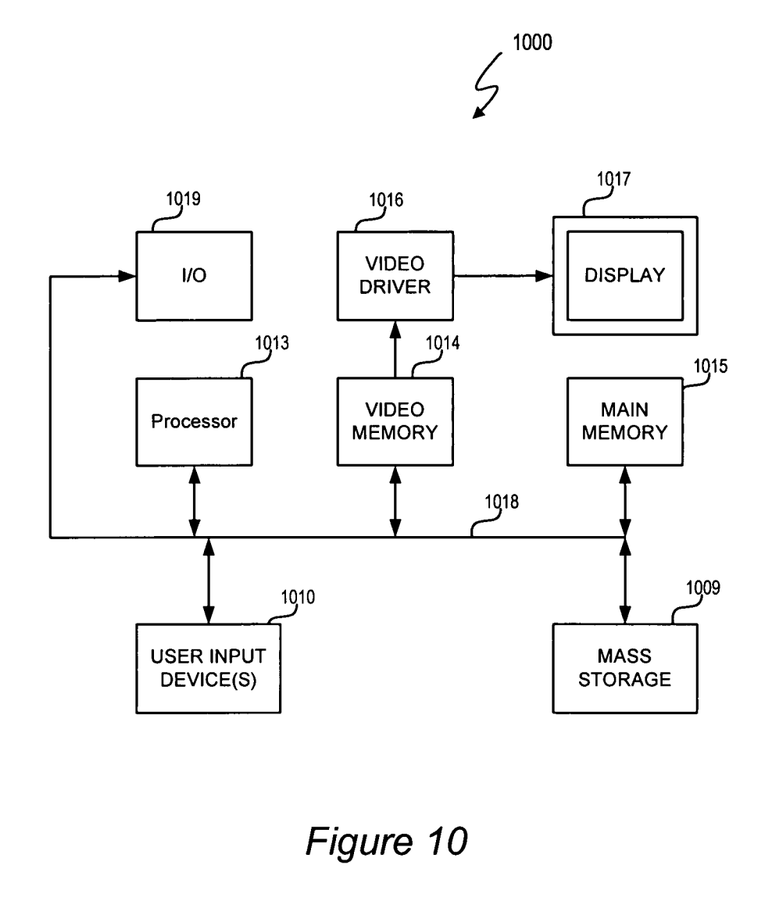
FIG. 10 depicts an example computer system used in the network of FIG. 9.

Embodiments of the demand validation system and procedure can be implemented on a computer system such as a general-purpose computer 1000 illustrated in FIG. 10. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 generally also includes a video memory 1014, main memory 1015 and mass storage 1009, all coupled to bi-directional system bus 1018 along with input user device(s) 1010 and processor 1013. The mass storage 1009 may include both fixed and removable media, such as other available mass storage technology. Bus 1018 may contain, for example, 32 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to a remote server computer systems via a telephone link or to the Internet via an ISP. I/O device(s) 1019 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1009 until loaded into main memory 1015 for execution. Computer programs may also be in the form of electronic signals modulated in accordance with the computer program and data communication technology when transferred via a network. The method and functions relating to demand validation system and procedure may be implemented in a computer program.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The demand validation system and procedure may be implemented in any type of computer system or programming or processing environment. It is contemplated that the demand validation system and procedure might be run on a stand-alone computer system, such as the one described above. The demand validation system and procedure might also be run from a server computer systems system that can be accessed by a plurality of client computer systems interconnected over an intranet network. Finally, the demand validation system and procedure may be run from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of validating demand data for products in an electronic data processing system and producing a supply of products in accordance with validated demand data, the method comprising:
    validating demand data for products in an electronic data processing system and producing a supply of products in accordance with validated demand data;
    wherein validating the demand data comprises:
        executing code by one or more processors of the electronic data processing system to configure the electronic data processing system into a machine and cause the machine to execute steps of:
            retrieving product demand data for a particular time period from an electronic memory;

retrieving product supply data for a time period that is approximately correlated in time with the particular time period associated with the product demand data;

processing the retrieved product demand data and product supply data to generate supply-demand imbalance data;

retrieving product commerce data associated with the products for the time period that is approximately correlated in time with the particular time period associated with the product demand data, wherein the product commerce data represents product movement;

comparing the supply-demand imbalance data with the product commerce data, wherein a negative imbalance data indicates undersupplied products, and positive imbalance data indicates oversupplied products;

generating validation data from a comparison of the supply-demand imbalance data with the product commerce data;

determining the validation data validates the product demand data if the supply-demand imbalance data trends toward undersupplied products as the product commerce data trends towards better than average product movement in commerce; and providing the validation data and product demand data to a manufacturer of the products represented in the product demand data to direct production of the one or more products in accordance with the product demand data that has been validated; and wherein producing the supply of products in accordance with validated demand data comprises:
accessing the validated demand data; and
producing the supply of the products configured in accordance with the product demand data that is validated.

2. The method of claim 1 further comprising:
performing by the electronic data processing system programmed with code and executable by a processor of the electronic data processing system to further configure the electronic data processing system into the machine for:
processing the validation data with one or more data processors to detect correlations, if any, between oversupply imbalance data and below average commerce movement data and undersupply imbalance data and above average commerce movement data, wherein any detected correlations indicate valid product demand data.

3. The method of claim 2 wherein processing the validation data comprises:
determining a validation trend from the compared supply-demand imbalance data and the product commerce data.

4. The method of claim 3 wherein determining a validation trend from the compared supply-demand imbalance data and the product commerce data further comprises:
determining if the validation data indicates that the supply-demand imbalance data trends toward undersupplied products as the product commerce data trends towards better than average product movement.

5. The method of claim 1 wherein processing the validation data comprises:
subtracting the product demand data from the product supply data on a product-by-product basis.

6. The method of claim 1 further comprising:
determining the product demand data.

7. The method of claim 6 wherein determining the product demand data comprises:
developing a set of master session profiles, wherein the master session profiles include product demand indicators;
processing at least a subset of user session data to evaluate the user session data using the master session profiles; and
determining product demand from the evaluations.

8. The method of claim 1 wherein the commerce data comprises dealer-to-dealer trade rate.

9. The method of claim 1 wherein the commerce data comprises an average number of days that a product is available for sale and remains unsold.

10. The method of claim 1 wherein the commerce data comprises a period supply for products of a particular type.

11. The method of claim 1 wherein the products are selected from the group comprising vehicles, airline tickets, or computers.

12. The method of claim 1 wherein each product comprises a different configuration of a base product model.

13. The method of claim 1 further comprising:
displaying the validation data.

14. The method of claim 13 wherein displaying the validation data comprises displaying the validation data in four quadrants comprising:
(I) product commerce data indicating better than average product movement versus oversupply imbalance data;
(II) product commerce data indicating better than average product movement versus undersupply imbalance data;
(III) product commerce data indicating worse than average product movement versus undersupply imbalance data; and
(IV) product commerce data indicating worse than average product movement versus oversupply imbalance data.

15. The method of claim 13 wherein displaying the validation data comprises:
displaying validation data points on a product-by-product basis, wherein a size of each validation data point represents a statistical significance of the validation data point.

16. The method of claim 14 wherein determining if the validation data validates the product demand data comprises determining if the validation data resides in quadrants II and IV.

17. The method of claim 14 wherein determining if the validation data validates the product demand data comprises determining if the validation data generally trends between quadrant II and IV.

18. The method of claim 1 wherein generating validation data further comprises:
generating validation data points on a product-by-product basis.

19. The method of claim 18 further comprising:
performing by the electronic data processing system programmed with code and executable by a processor of the electronic data processing system to configure the electronic data processing system into the machine for:
weighting each validation data point in accordance with a number of equivalent products represented by the validation data point.

20. The method of claim 1 further comprising:
retrieving from multiple types of commerce data from one or more data storage devices; and comparing the product demand with the multiple types of commerce data to increase a confidence level in the validation data.

21. An apparatus for validating demand data for products in an electronic data processing system and producing a supply of products in accordance with validated demand data, the apparatus comprising:
a product demand data validation system for validating demand data for products in an electronic data processing system and a manufacturing system for producing a supply of products in accordance with validated demand data;
wherein the product demand data validation system comprises:
one or more non-transitory computer readable media having code stored therein and executable by one or more processors to configure a computer system machine as the product demand data validation system to:
generate supply-demand imbalance data from product demand data and product supply data;
receive the supply-demand imbalance data, compare the supply-demand imbalance data with product commerce data;
generate validation data from a comparison of the supply-demand imbalance data with the product commerce data, wherein the product commerce data represents product movement and the product demand data, the product supply data, and the product commerce data are all three correlated with a same time period;
determine the validation data validates the product demand data if the supply-demand imbalance data trends toward undersupplied products as the product commerce data trends towards better than average product movement in commerce; and
provide the validation data and product demand data to a manufacturer of the products represented in the product demand data to direct production of the one or more products in accordance with the product demand data that has been validated; and
wherein the manufacturing system comprises:
a manufacturing system to produce the supply of the products configured in accordance with the product demand data that is validated.

22. The product demand data validation system of claim 21 wherein to generate supply-demand imbalance data from product demand data and product supply data comprises subtracting the product demand data from the product supply data on a product-by-product basis.

23. The product demand data validation system of claim 21 further comprising:
a display to display the validation data.

24. The product demand data validation system of claim 23 wherein the display comprises a display of validation data points on a product-by-product basis, wherein a size of each validation data point represents a statistical significance of the validation data point.

25. The product demand data validation system of claim 23 wherein the display comprises four quadrants depicting:
(I) product commerce data indicating better than average product movement versus oversupply imbalance data;
(II) product commerce data indicating better than average product movement versus undersupply imbalance data;
(III) product commerce data indicating worse than average product movement versus undersupply imbalance data; and
(IV) product commerce data indicating worse than average product movement versus oversupply imbalance data.

26. The product demand data validation system of claim 25 wherein to determine if the validation data validates the product demand data comprises determining if the validation data resides in quadrants II and IV.

27. The product demand data validation system of claim 21 wherein to generate validation data comprises generating validation data points on a product-by-product basis and weighting each validation data point in accordance with a number of equivalent products represented by the validation data point.

28. The product demand data validation system of claim 21 wherein the code is further executable by the one or more processors to further configure the computer system machine as the product demand data validation system to:
develop a set of master session profiles, wherein the master session profiles include product demand indicators;
process at least a subset of user session data to evaluate the user session data using the master session profiles; and
determine product demand from the evaluations.

29. The product demand data validation system of claim 21 wherein the commerce data comprises dealer-to-dealer trade rate.

30. The product demand data validation system of claim 21 wherein the commerce data comprises an average number of days that a product available for sale and remains unsold.

31. The product demand data validation system of claim 21 wherein the commerce data comprises a period supply of products of a particular type.

32. The product demand data validation system of claim 21 wherein the products are selected from the group comprising vehicles, airline tickets, or computers.

33. The product demand data validation system of claim 21 wherein the code is further executable by the one or more processors to:
retrieve from multiple types of commerce data from one or more data storage devices; and
compare the product demand with the multiple types of commerce data to increase a confidence level in the validation data.

34. An apparatus for validating demand data for products in an electronic data processing system and producing a supply of products in accordance with validated demand data, the apparatus comprising:
a non-transitory, computer readable medium comprising code encoded therein and executable by a processor to cause the processor to configure a data processing system as a product demand data validation system to:
retrieve (a) product demand data for a particular time period from an electronic memory, (b) product supply data for a time period that is approximately correlated in time with the particular time period associated with the product demand data, and (c) product commerce data associated with the products for the time period that is approximately correlated in time with the particular time period associated with the product demand data, wherein the product commerce data represents product movement;
process the retrieved product demand data and product supply data with one or more data processors to generate supply-demand imbalance data;

compare the supply-demand imbalance data with the product commerce data, wherein a negative imbalance data indicates undersupplied products, and positive imbalance data indicates oversupplied products;

generate validation data from a comparison of the supply-demand imbalance data with the product commerce data;

determine the validation data validates the product demand data if the supply-demand imbalance data trends toward undersupplied products as the product commerce data trends towards better than average product movement in commerce; and provide the validation data and product demand data to a manufacturer of the products represented in the product demand data to direct production of the one or more products in accordance with the product demand data that has been validated; and a manufacturing system to produce a supply of the products configured in accordance with the product demand data that is validated.

35. The non-transitory, computer readable medium of claim 34 wherein to process the retrieved product demand data and product supply data with one or more data processors to generate supply-demand imbalance data comprises subtracting the product demand data from the product supply data on a product-by-product basis.

36. The non-transitory, computer readable medium of claim 34 the code further comprising:
display code to display the validation data.

37. The non-transitory, computer readable medium of claim 34 wherein the code is further executable by the processor to determine a validation trend from the compared supply-demand imbalance data and the product commerce data by determining if the validation data indicates that the supply-demand imbalance data trends toward undersupplied products as the product commerce data trends towards better than average product movement.

38. The product demand data validation system of claim 34 wherein the code is further executable by the processor to:
retrieve from multiple types of commerce data from one or more data storage devices; and
compare the product demand with the multiple types of commerce data to increase a confidence level in the validation data.

39. An apparatus for validating demand data for products in an electronic data processing system and producing a supply of products in accordance with validated demand data, the system, the apparatus comprising:
a system for (A) displaying product demand validation data derived from (i) supply-demand imbalance data generated by a comparison between product supply data and product demand data and (ii) product commerce data and (B) producing a supply of products configured in accordance with validated product demand data, the system comprising:
a display apparatus;
a memory having display data encoded therein;
a processor, coupled to the memory, to access the display data and cause the display apparatus to display:
a first quadrant for the product demand validation data derived from product commerce data indicating better than average product movement versus oversupply supply-demand imbalance data, wherein the product commerce data represents product movement and the product demand data, the product supply data, and the product commerce data are all three correlated with a same time period;
a second quadrant for the product demand validation data derived from product commerce data indicating better than average product movement versus undersupply supply-demand imbalance data;
a third quadrant for the product demand validation data derived from product commerce data indicating worse than average product movement versus undersupply supply-demand imbalance data; and
a fourth quadrant for the product demand validation data derived from product commerce data indicating worse than average product movement versus oversupply supply-demand imbalance data, wherein product demand data is validated if the product demand validation data reflects a trend with a positive slope in a direction from the second quadrant to the third quadrant;
an input/output device to provide the validation data and product demand data to a manufacturer of the products represented in the product demand data to direct production of the one or more products in accordance with the product demand data that has been validated; and
a manufacturing system to produce a supply of products configured in accordance with the validated product demand data.

40. The system of claim 39 wherein the display data further comprises data to cause the processor to display:
weighted validation data on a product-by-product basis; and
a relationship trend of the validation data.

41. The system of claim 39 wherein the supply-demand imbalance data comprises product demand data subtracted from product supply data on a product-by-product basis.

42. An electronic product demand data validation system for validating demand data for products in an electronic data processing system and producing a supply of products in accordance with validated demand data, the system comprising:
means for retrieving product demand data for a particular time period from an electronic memory;
means for retrieving product supply data for a time period that is approximately correlated in time with the particular time period associated with the product demand data;
means for processing the retrieved product demand data and product supply data with one or more data processors to generate supply-demand imbalance data;
means for retrieving product commerce data associated with the products for the time period that is approximately correlated in time with the particular time period associated with the product demand data, wherein the product commerce data represents product movement;
means for comparing the supply-demand imbalance data with the product commerce data, wherein a negative imbalance data indicates undersupplied products, and positive imbalance data indicates oversupplied products;
means for generating validation data from a comparison of the supply-demand imbalance data with the product commerce data;
means for determining the validation data validates the product demand data if the supply-demand imbalance data trends toward undersupplied products as the product commerce data trends towards better than average product movement in commerce;

means for providing the validation data and product demand data to a manufacturer of the products represented in the product demand data to direct production of the one or more products in accordance with the product demand data that has been validated; and means for producing a supply of the products configured in accordance with the product demand data that is validated.

* * * * *